United States Patent
Bae et al.

(10) Patent No.: US 7,487,172 B2
(45) Date of Patent: Feb. 3, 2009

(54) THREE-DIMENSIONAL DATA STRUCTURE FOR STORING DATA OF MULTIPLE DOMAINS AND THE MANAGEMENT THEREOF

(75) Inventors: Myung M. Bae, Pleasant Valley, NY (US); Jeffrey S. Lucash, Hurley, NY (US); Michael A. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/336,477

(22) Filed: Jan. 20, 2006

(65) Prior Publication Data

US 2007/0174264 A1 Jul. 26, 2007

(51) Int. Cl.
G06F 7/00 (2006.01)
G06F 17/30 (2006.01)
(52) U.S. Cl. .................. 707/101; 707/102; 707/205
(58) Field of Classification Search ............ None
See application file for complete search history.

(56) References Cited

U.S. PATENT DOCUMENTS

| | | | | |
|---|---|---|---|---|
| 4,814,976 A | * | 3/1989 | Hansen et al. | 711/201 |
| 5,359,724 A | * | 10/1994 | Earle | 707/205 |
| 5,963,936 A | | 10/1999 | Cochrane et al. | 707/3 |
| 6,272,672 B1 | | 8/2001 | Conway | 717/1 |
| 6,750,864 B1 | | 6/2004 | Anwar | 345/440 |

OTHER PUBLICATIONS

Kyle Loudon, Mastering Algorithms in C, pub Jan. 8, 1999, O'Reilly & Associates, Chapters 5 and 8.*

Charles P. Wright, C-Scene: A Simple Hash Table Implementation, Jul. 25, 1998, Issue 5, http://www.gmonline.demon.co.uk/cscene/CS5/CS5-02.html.*

Christopher Clark, C Hash Table, webarchive dates from 2002, http://www.cl.cam.ac.uk/~cwc22/hashtable/.*

John Boyer, Algorithm Alley: Resizable Data Structures, Jan. 1, 1998, Dr. Dobb's Journal, http://www.ddj.com/architect/184410473.*

Frieder, Multiprocessor Algorithms for Relational-Database Operators on Hypercube Systems, Nov. 1990, Computer vol. 23 iss. 11, pp. 13-14.*

Frank, A Generating Function That Counts The Combinatoral Full-Span Sub Array Structure of a Regular Array with Some Applications to APL, Jun. 14, 2003, ACM, APL '03 Array-Programming Languages, Abstract, Generally.*

(Continued)

*Primary Examiner*—Pierre M. Vital
*Assistant Examiner*—Jason Liao
(74) *Attorney, Agent, or Firm*—Geraldine Monteleone, Esq.; Kevin P. Radigan, Esq.; Heslin Rothenberg Farley & Mesiti, P.C.

(57) ABSTRACT

A three-dimensional data structure for storing data is defined and maintained. The three-dimensional data structure includes at least one column of data having a depth greater than zero indicating that multiple data values are provided for multiple domains represented by the structure. The data structure also includes zero or more columns of data having a depth of zero indicating that the data value of a zero depth column is invariable for a plurality of domains represented by the structure. The structure is maintained by employing various operations including, create, write and read operations.

9 Claims, 7 Drawing Sheets

OTHER PUBLICATIONS

"On Optimizing an SQL-like Nested Query", Won Kim, ACM Transactions on Database Systems, vol. 7, No. 3, Sep. 1982, pp. 443-469.

"Query Evaluation Techniques for Large Databases", Goetz Graefe, ACM Computing Surveys, vol. 25, No. 2, Jun. 1993.

* cited by examiner fig. 1 fig. 2 fig. 3 fig. 4 fig. 5 fig. 6 fig. 7 fig. 8

THREE-DIMENSIONAL DATA STRUCTURE FOR STORING DATA OF MULTIPLE DOMAINS AND THE MANAGEMENT THEREOF

TECHNICAL FIELD

This invention relates, in general, to data management within an operating environment, and in particular, to a three-dimensional data structure used to store data of multiple domains of the operating environment and the management thereof.

BACKGROUND OF THE INVENTION

Data structures are used to store data, and there are various types of data structures. One type of data structure is a table structure, in which the data is maintained in rows and columns. The data can represent any kind of information. As just one example, configuration information is often maintained in a data structure, such as a database oriented table, in which the rows include various configured resources and the columns include the various attributes associated with those resources. In some cases, the same resource is included in multiple different overlapping domains (e.g., sets of nodes of a distributed system or cluster), and one or more of the attributes associated with that resource are different depending on the domain.

Currently, to represent the data of multiple domains, additional attribute columns are defined for each domain; an array of data definitions based on the domain are placed in the column; or even separate tables are utilized. If additional attribute columns are defined, the client must know which column to reference in which domain and must adjust the table definition as the number of such domains increases or decreases. If an array is used, access to the relevant information requires that the client index correctly to the proper value and update only that field. If separate tables are utilized, any update to a column with no domain orientation requires that all such tables be updated atomically.

The current solutions for representing multiple domains are inefficient. For example, the use of separate tables or the use of redundantly provided data for each domain needlessly increases the amount of storage used. Further, maintaining these tables also has inefficiencies associated therewith, since multiple tables or multiple sets of data need to be maintained.

Based on the foregoing, a need exists for an improved data structure to represent data of different domains that avoids the inefficiencies of current solutions. In one particular example, a need exists for a data structure in which common data among the domains is not replicated.

SUMMARY OF THE INVENTION

The shortcomings of the prior art are overcome and additional advantages are provided through the provision of a data structure stored on at least one storage medium of an operating environment and accessible by an application executing within the operating environment. The data structure includes, for instance, a three-dimensional data structure for storing data of a plurality of domains. The three-dimensional data structure includes a column of data having a depth greater than zero indicating that multiple data values are provided for multiple domains of the plurality of domains, and wherein at least one data value of the multiple data values is different from at least one other data value of the multiple data values.

In a further embodiment, the three-dimensional data structure further includes another column of data, the another column of data having a depth of zero indicating that the data value of the another column is invariable for the plurality of domains.

In another aspect, a method of providing data in an operating environment having a plurality of domains is provided. The method includes, for instance, identifying a domain for which data is to be provided; and obtaining the data for the identified domain from a three-dimensional data structure storing data for a plurality of domains. The three-dimensional data structure includes a column of data having a depth greater than zero indicating that multiple data values are provided for multiple domains of the plurality of domains, wherein at least one data value of the multiple data values is different from at least one other data value of the multiple data values; and zero or more columns of data having a depth of zero, wherein the data value of a zero depth column is invariable for the plurality of domains.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a three-dimensional data structure for storing data of a plurality of domains is provided. The three-dimensional data structure includes one or more rows, each row including one or more columns of data. At least one column of the data structure has a depth greater than zero to store data for the plurality of domains represented by the three-dimensional data structure. Further, in one example, at least one column of the data structure has a depth of zero indicating that a single value represents information that is common to the domains of the structure.

As used herein, a domain is any entity that associates items with one another. One example of a domain is a cluster having a plurality of nodes. Domains are represented in the three-dimensional data structure via column depth, in which each depth represents a different domain. However, information common to multiple domains is not repeated in the structure, but maintained in the structure in one or more zero depth columns. Information that is variant for the different domains is stored in columns having a depth greater than zero.

The three-dimensional data structure is maintained, in accordance with an aspect of the present invention, by employing several operations. These operations include, but are not limited to, creating a domain, creating a row in a domain, reading a row, writing a row, deleting a row and deleting a domain, each of which is described in further detail below.

Figure 1:
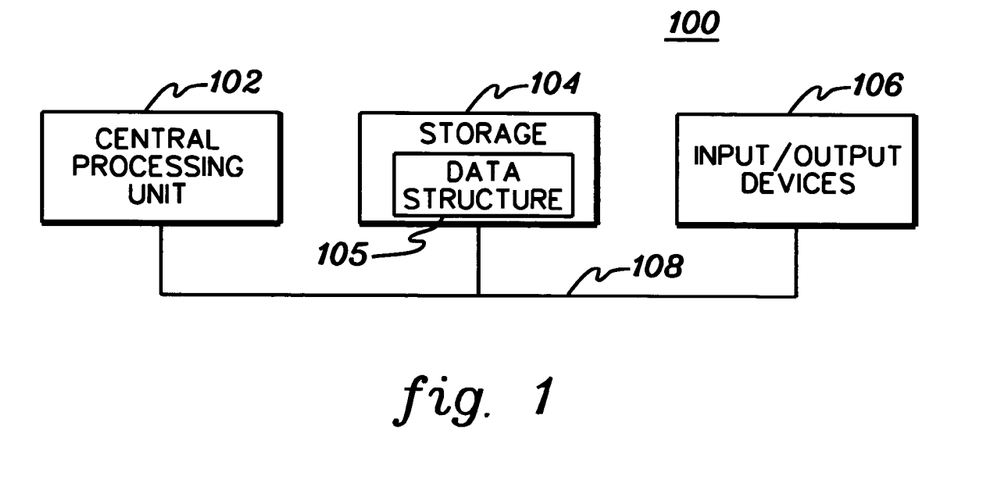
FIG. 1 depicts one embodiment of an operating environment to incorporate and use one or more aspects of the present invention.

The three-dimensional data structure is defined, stored, maintained and used within an operating environment. One embodiment of such an operating environment is described with reference to FIG. 1. An operating environment 100 includes, for instance, at least one central processing unit 102 to execute at least one operating system and to control sequencing and processing within the environment; one or more storage media 104 to store data, including at least one three-dimensional data structure 105 of the present invention; and one or more input/output devices 106 to enable input/output of the environment. The components of the environment are coupled to one another via, for instance, one or more busses 108.

In one example, operating environment 100 includes an RS/6000 computer system running an AIX or Linux operating system. (RS/6000 and AIX are offered by International Business Machines Corporation; Linux is offered for free online at www.linux.org.) The invention is not limited to such an environment, however. The capabilities of the present invention can be incorporated and used with many types of operating environments, including other types of computing environments and many types of computer systems. For instance, as a further example, the three-dimensional data structure may be incorporated and used in an operating environment that includes a plurality of clusters, as described further below.

Figure 2:
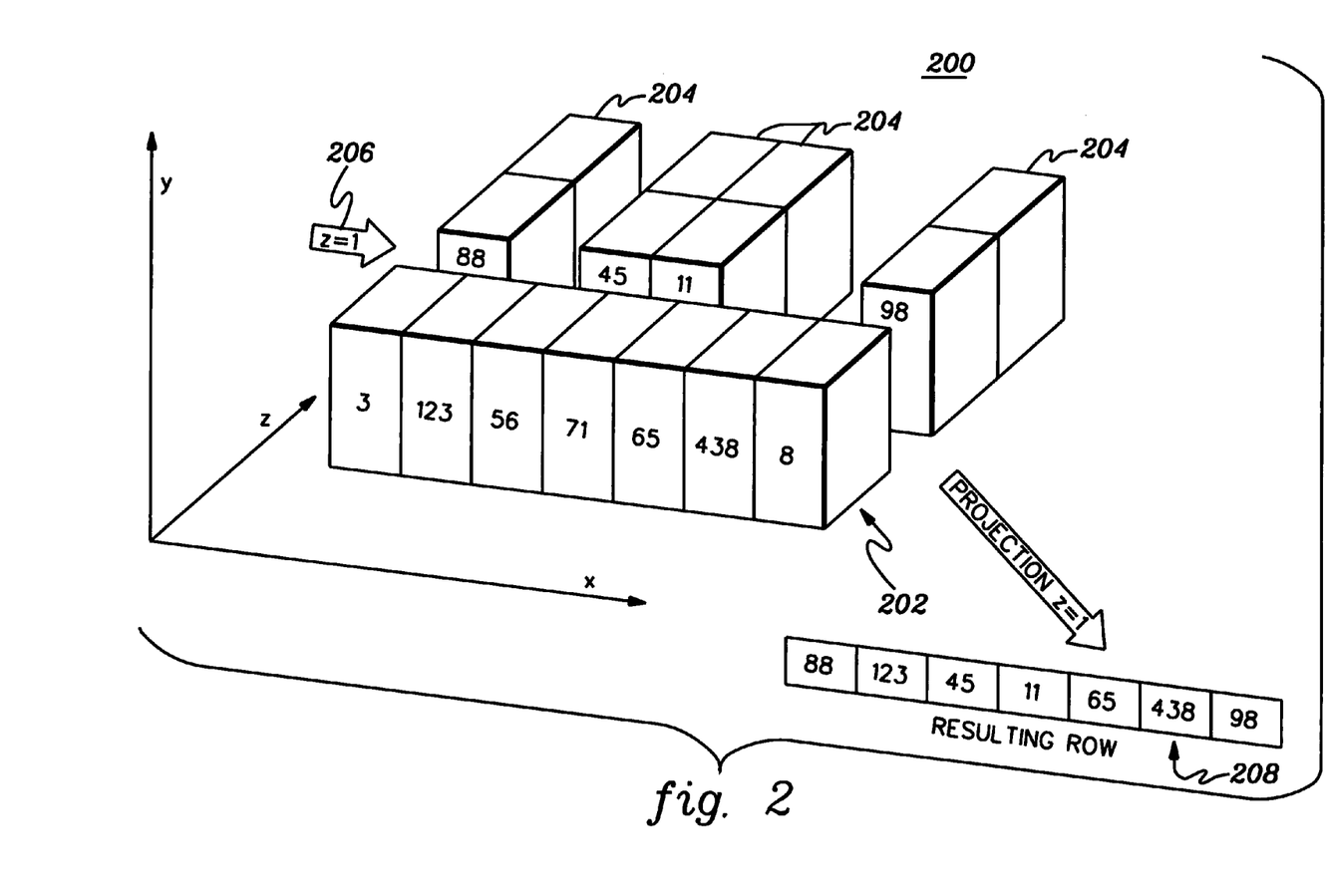
FIG. 2 depicts one example of a three-dimensional data structure, in accordance with an aspect of the present invention.

One embodiment of a three-dimensional data structure is described with reference to FIG. 2. As depicted in FIG. 2, in this particular example, a three-dimensional data structure 200 includes one row (y) 202 and a plurality of columns (x) 204. Each column has a depth (z) of zero or more, in accordance with an aspect of the present invention. The depth of a column is defined herein as the maximum index value for the column. In the particular example depicted, column one has a depth of two: z=0 has a value of 3, z=1 has a value of 88, and the value for z=2 is not shown for clarity purposes. The second column, however, has a depth of zero in that there is only a single value in that column, which is 123. That value is the same for all the domains represented in the three-dimensional data structure.

A three-dimensional data structure can have one or more rows and one or more columns. Only one row is depicted in FIG. 2 for ease of understanding. However, it will be understood that the structure may include any number of rows. Further, the number of columns may vary. The number of columns shown in FIG. 2 is only one example. Yet further, the depth may be less than or greater than two, and depends, for instance, on the number of domains being represented by the structure. The three-dimensional data structure of FIG. 2 is only one example and the number of rows, columns and depth were chosen to provide an understanding of one or more aspects of the present invention. Many other examples are possible and are included within the spirit of the present invention.

In accordance with an aspect of the present invention, each depth of data represents data for a particular domain. However, data that is the same for each domain need not be repeated. For example, domain 1 (i.e., z=1) includes a row of data as indicated at reference numeral 206. This row of data (208) includes the values 88, 123, 45, 11, 65, 438 and 98. Columns 2, 5 and 6 have a depth of zero, since the data in those columns are the same for each domain. However, columns 1, 3, 4 and 7 have different values for domain 1 than domain 0, and thus, are shown by column depth.

A column is defined as having depth at the time, for instance, that the data structure is defined (e.g., using SQL). A column that has depth is referred to herein as a domain column. In a further embodiment, a domain column is created dynamically, when a domain is created that has data in the column that is different from data already in the column for a different domain. Other embodiments also exist.

In accordance with an aspect of the present invention, the three-dimensional data structure of the present invention is managed by employing different operations, including, for instance, creating a domain in the structure, creating a row in a domain, reading a row, writing a row, deleting a row and/or deleting a domain. Many of these operations are described in further detail with reference to the logic flows of FIGS. 3-6. The logic of these operations is executed in an operating environment, such as the environment depicted in FIG. 1, or in other types of environments. In the logic flows, the domain being referenced is specified either explicitly on a database command or implicitly via a background operation to the data structure itself. Once this information is specified, operations performed on the data structure, by, for instance, a database manager, use this as a reference value for indexing into the column arrays (if any). Additionally, database operations indirectly specify the row (y) by specifying the key value, and directly specify the column (x) values by indicating which columns are being referenced. The domain (z) value may be specified independently of the application by system software prior to the database operation.

Figure 3:
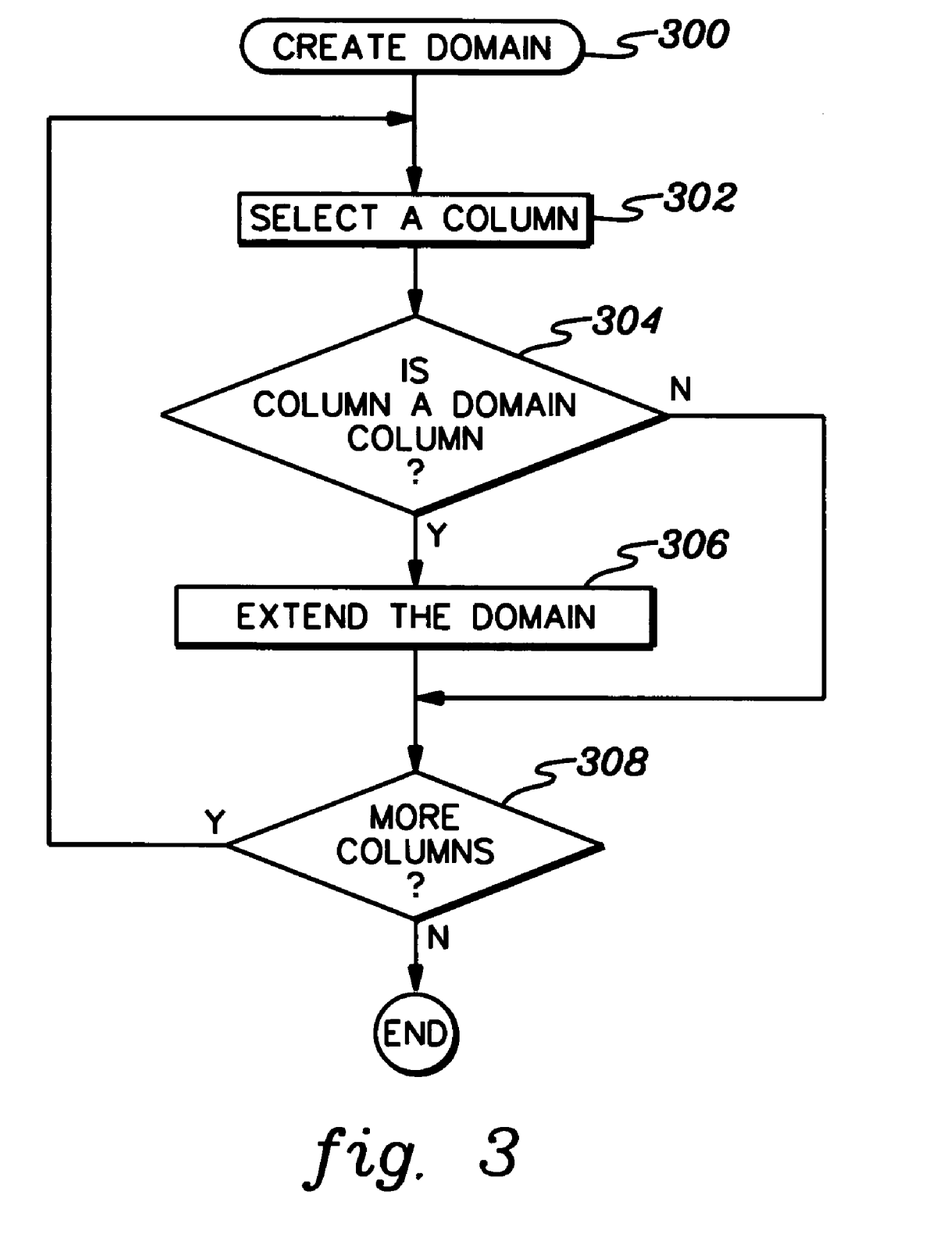
FIG. 3 depicts one embodiment of the logic associated with creating a domain of the three-dimensional data structure of FIG. 2, in accordance with an aspect of the present invention.

One embodiment of the logic associated with creating a domain is described with reference to FIG. 3. To create a domain, STEP 300, initially a column is selected, STEP 302, and a determination is made as to whether the selected column is a domain column, INQUIRY 304. A domain column is a column that has depth, and the determination is made by checking metadata associated with the column. If the column is a domain column, then the domain is extended, STEP 306. This includes, for instance, increasing the amount of space in the current structure and copying the old information into the reallocated space. Thereafter, or if the column is not a domain column, then a further determination is made as to whether there are more columns to be selected, INQUIRY 308. If there are more columns to be selected, then processing continues with STEP 302 "Select A Column." Otherwise, the create domain processing is complete.

Further implementation details for creating a domain are described below with reference to pseudocode. In the description of the pseudocode for creating a domain, as well as for other operations, "Y" refers to a row value, "X" refers to a column value, and "Z" refers to a domain value. Further, the following metadata is employed: Column_Metadata(X) specifies whether column X is indexed (1) or not (0), indicating whether that particular column has a depth greater than zero; Row_Metadata(Z) indicates whether the row exists (1) or not (0) for Domain Z; and Domain_Metadata includes the maximum value of Z.

One example of the pseudo-code for creating a domain is as follows:

```
If Action == Create_Domain { (350)
   For each column { (352)
      if Column_Metadata(X)==1 { (354)
         for each row { (356)
            reallocate Row_Metadata(Domain_Metadata) as
               Row_Metadata(Domain_Metadata+1) (358)
            Row_Metadata(Domain_Metadata+1) = 0 (360)
            reallocate Row(Y).Column(X).Value_Array(Domain_Metadata)
               as
               Row(Y).Column(X).Value_Array(Domain_Metadata+1)
                                                         (362)
         }
      }
   }
   Domain_Metadata = Domain_Metadata +1; (364)
   return Domain_Metadata (366)
}
else if Domain(Z) > Domain_Metadata return error. (368)
```

Referring to the above pseudo-code, if the action being specified is create domain (350), then for each column of the data structure (352), a determination is made as to whether the column is a domain column (354). If it is a domain column, then for each row (356), the row metadata is reallocated (358) to increase the amount of space of the row metadata and to copy the old information into the new space. Additionally, an indication is made that there is no row for that particular domain (360). Further, space is made for a new row by reallocating (362) the old row and copying the information for the old row into the new space. After each column in the data structure is addressed, the value of domain metadata is increased by one (364) and the domain metadata is returned (366).

If the action is not create domain, then the action being requested is a create, write or read of a row in a particular domain. Thus, a check is made as to whether Domain Z is greater than the value of the domain metadata 368. If so, then an error is returned.

Another operation employed to manage the data structure is a create row operation. A row is created in a particular domain. The presence of a row in a domain is dependent upon whether or not the row has been written in that domain. Thus, if the row has been created in domain Z, Row Metadata(Z) is set to one; otherwise it is zero. There is an assumption that if Column_Metadata(X)==0, any write operation to Row Y.Column X in any Domain Z affects all of the domains for which that row is defined.

Figure 4:
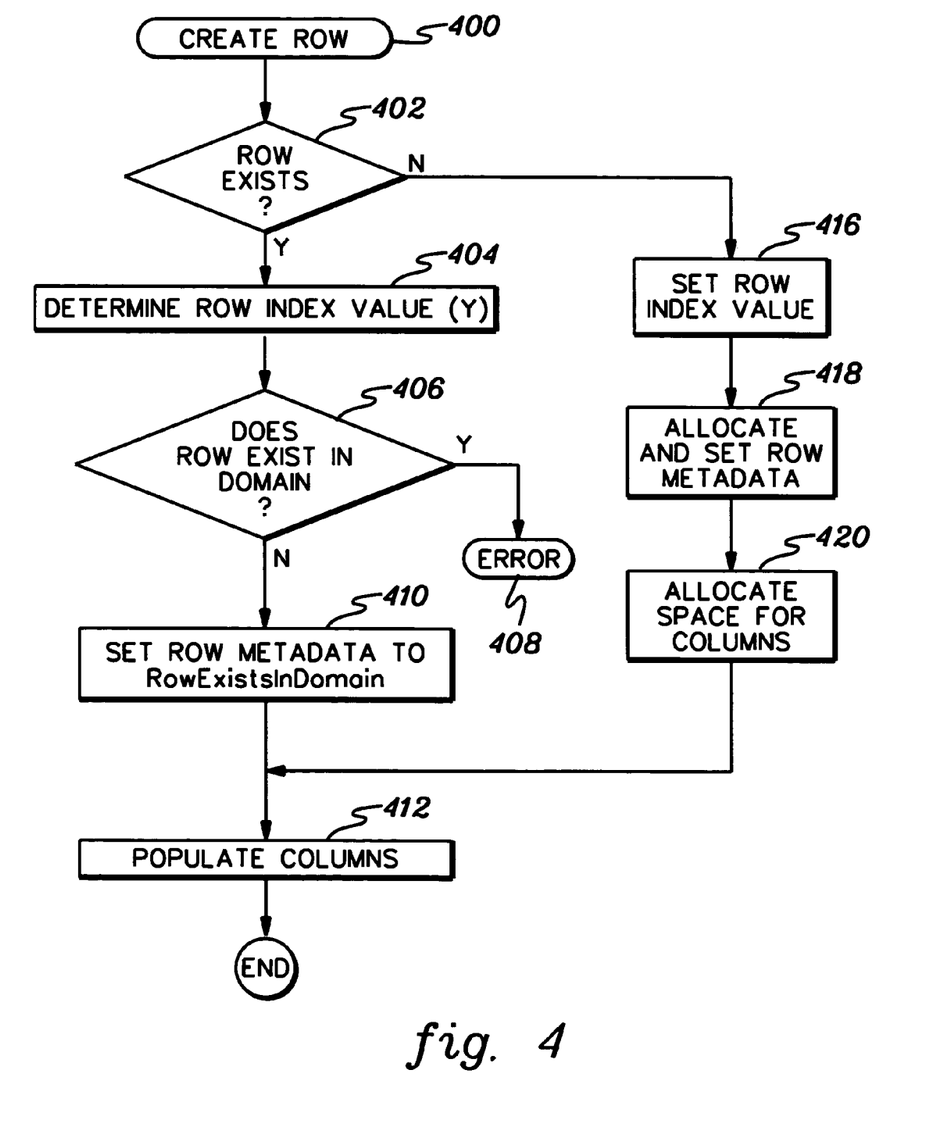
FIG. 4 depicts one embodiment of the logic associated with creating a row in the three-dimensional data structure of FIG. 2, in accordance with an aspect of the present invention.

One embodiment of the logic associated with creating a row in a domain is described with reference to FIG. 4. In creating a row, STEP 400, initially a determination is made as to whether the row already exists, STEP 402. This determination is made by checking the data structure for the unique key being provided in the create row operation. If the key exists in the data structure, then the row exists.

If the row does exist in the data structure, then Y is set to the row index of the row located in the search of the unique key, STEP 404. A determination is then made as to whether the row exists in the particular domain, INQUIRY 406. If the row already exists in the domain, then an error is indicated, STEP 408. Otherwise, processing continues with setting the row metadata (e.g., to one) to indicate that the row now exists in the domain, STEP 410, and to populating the columns of the row (e.g., updating the values of the specified columns), STEP 412.

Returning to INQUIRY 402, if the row does not already exist, then the row is created. The row index (Y) is set, STEP 416; and space for the row metadata is allocated and the row metadata is set to indicate existence of the row, STEP 418. Additionally, space for one or more columns is allocated, STEP 420, and the columns are populated, STEP 412.

Further details regarding the implementation of creating a row in the three-dimensional data structure of an aspect of the present invention is described below with reference to the following pseudo-code:

```
If Action == Create_Row { (450)
   If Row exists { (452)
      Set Y value (454)
      if Row_Metadata(Z) == 1 return error. (456)
      Else Row_Metadata(Z) = 1; (458)
   }
   else{
      set Y value (460)
      allocate Row_Metadata(Domain_Metadata) = 0 (462)
      Row_Metadata(Z) = 1; (464)
      for each column { (466)
         if Column_Metadata(X) == 1 { (468)
            allocate Row(Y).Column(X).Array(Domain_Metadata) = 0 (470)
         }
         else Row(Y).Column(X) = Column_Default(X) (472)
      }
   }
   for each column specified { (474)
      if Column_Metadata(X) == 1 { (476)
         Row(Y).Column(X).Array(Z) = value (478)
      }
      else Row(Y).Column(X) = value (480)
   }
}
```

Referring to the above pseudo-code, if the action is a create row operation (450), and if the row exists in the data structure (452), the row index (Y) value is set (452). If the row metadata indicates that the row already exists in the specific domain that is being worked on, then an error is returned (456). Otherwise, the row metadata is set to one (458) indicating the row now exists in the domain.

If the row does not exist in any domain of the data structure, then again the row index (Y) value is set (460), and space is allocated for the row metadata, which is initialized to zero for this domain (462). The row metadata is then set to one to indicate that the row now exists in this particular domain (464). For each column in the row (466), if the column is a domain column (468), then space is allocated in this domain for the column and it is initialized to zero (470). Otherwise, the column is set to its default (472).

Thereafter, for each column specified (474) (i.e., each column to be updated), if the column is a domain column (476), then index into the array for that column and set the column to the specified value (478). If it is not a domain column, then set the single column value to the specified value (480).

Another operation that may be performed on this three-dimensional data structure is reading a row in the data structure. One embodiment of the logic associated with reading a row is described with reference to FIG. 5. To read a row, STEP 500, a determination is made as to whether the row exists, STEP 502. If the row does not exist, then an error is indicated, STEP 504. However, if the row does exist, then a column of the row is selected, STEP 506, and a determination is made as to whether that column is a domain column, STEP 508. If the column is not a domain column, then the one value of the column (i.e., a zero depth) is selected and that value is provided, STEP 510. However, if the column is a domain column, then the value to be provided is selected by indexing into the array to that particular domain and selecting the value at that domain, STEP 512.

Figure 5:
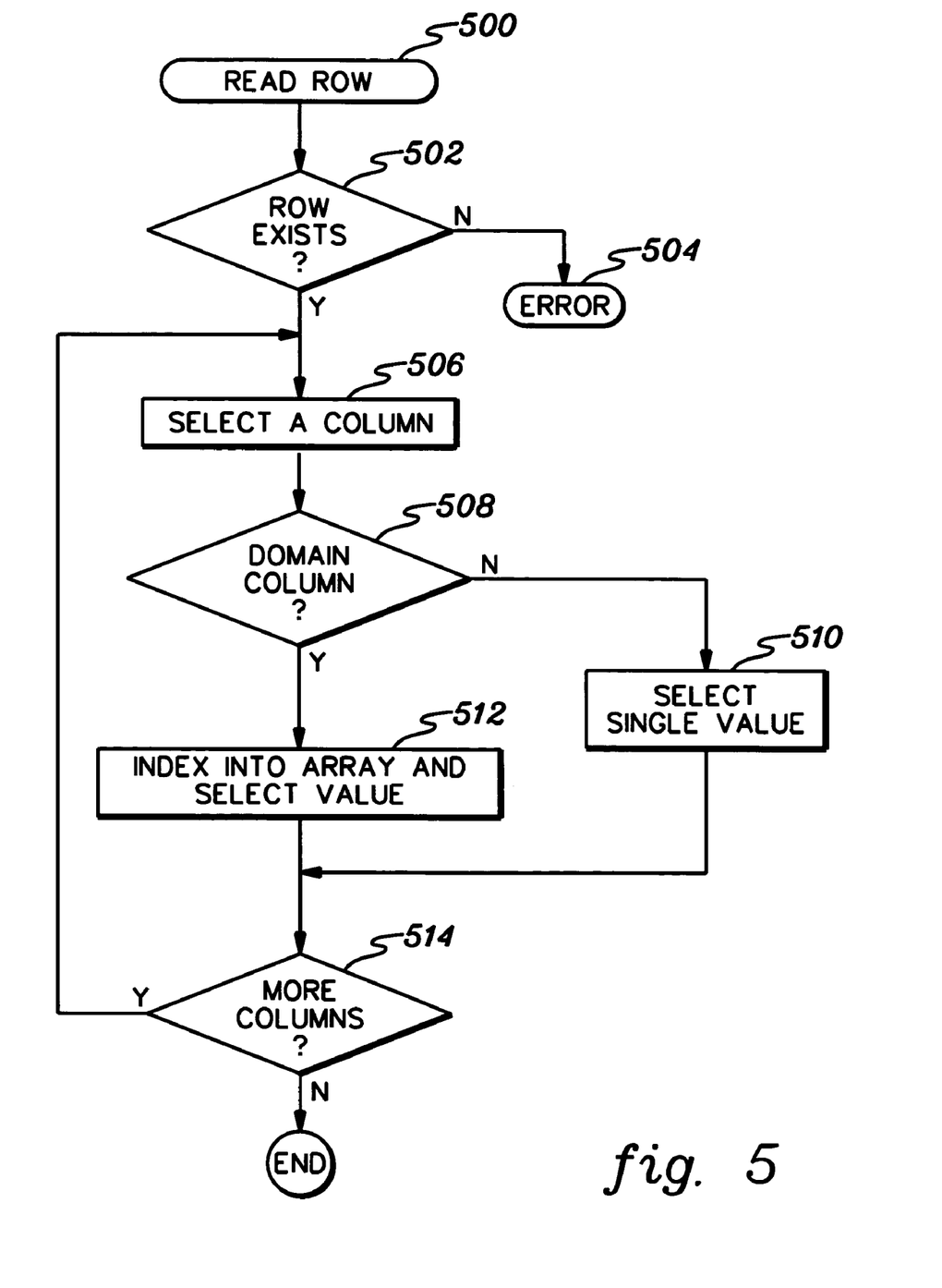
FIG. 5 depicts one embodiment of the logic associated with reading a row from the three-dimensional data structure of FIG. 2, in accordance with an aspect of the present invention.

Subsequent to selecting the value, a determination is made as to whether there are more columns to be read, INQUIRY 514. If so, then processing continues with STEP 506; otherwise, the read processing is complete. The result of the read processing is a projection of the appropriate data (see, e.g., FIG. 2, 208).

Further implementation details regarding reading a row of data are described below with reference to the following pseudo-code:

```
If Action == Read_Row { (550)
    if Row exists { (552)
        Set Y value (554)
        If Row_Metadata(Z) == 0 return error (556)
        For each column requested { (558)
            If Column_Metadata(X) == 1 Get value
                Row(Y).Column(X).Array(Z) (560)
            Else Get value Row(Y).Column(X) (562)
        }
    }
    else return error (564)
}
```

As shown in the above pseudocode, if the action is a read operation (550) and the row exists (552), then the index of that row is set (552). A determination is made as to whether the row exists in the domain that has been specified (556). If not, then an error is returned. However, if the row does exist, then for each column requested (558), the appropriate value is obtained. The appropriate value is the value at the depth indicated by the domain, if it is a domain column (560), or the one value of the column, if it is a zero depth column (562).

If the row does not exist in the data structure, then an error is returned (564).

A further operation that may be performed on the data structure is a write row operation. One embodiment of the logic associated with writing a row is described with reference to FIG. 6. To write a row, STEP 600, a determination is made as to whether the row exists, INQUIRY 602. If the row does not exist, then create row is called, STEP 604. If the row does exist, the columns specified in the operation are updated, STEP 606. Thereafter, or after the call create is complete, a database write operation is performed, STEP 610. As examples, this database write operation includes writing to a log or requires a distributed two-phase commit operation.

Figure 6:
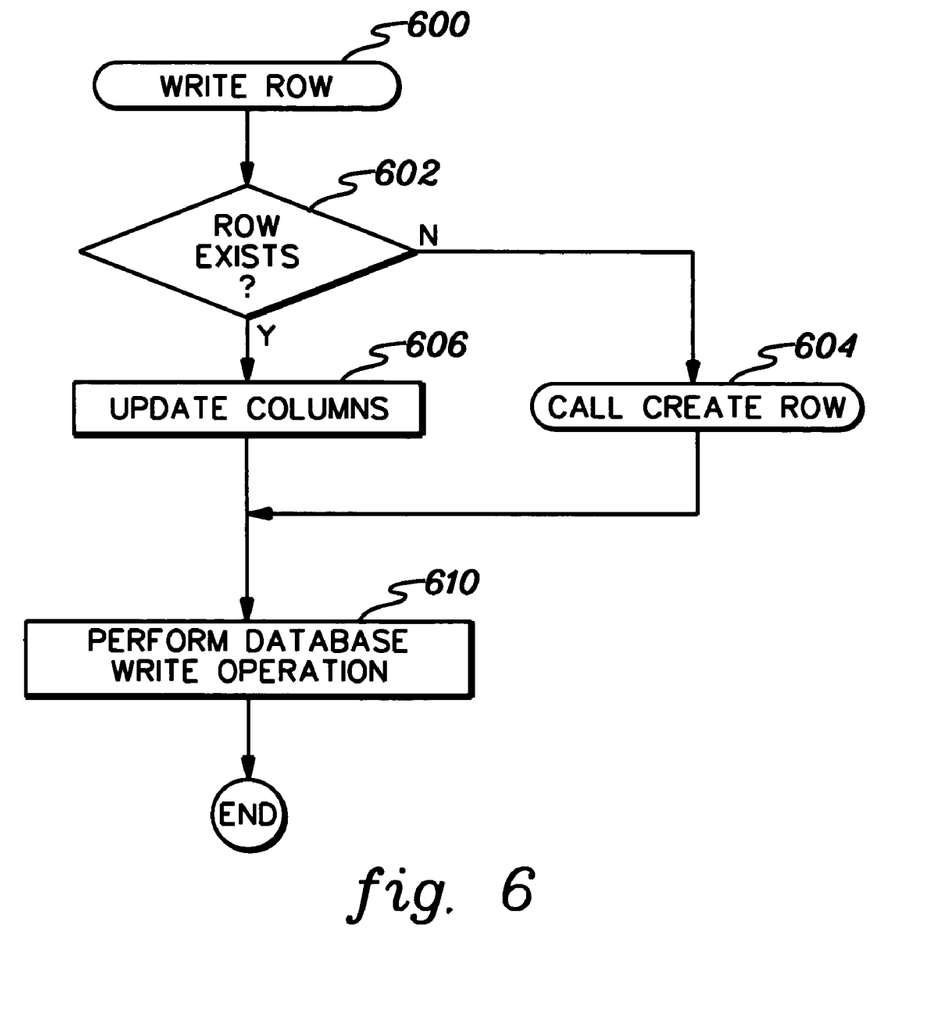
FIG. 6 depicts one embodiment of the logic associated with writing a row in the three-dimensional data structure of FIG. 2, in accordance with an aspect of the present invention.

Further details regarding the write row operation are described below with reference to the following pseudocode:

```
If Action == Write_Row { (650)
    If Row exists { (652)
        Set Y value (654)
        If Row_Metadata(Z) == 0 Row_Metadata(Z) = 1 (656)
        For each column { (658)
            If Column(Metadata(X) == 1 { (660)
                Row(Y).Column(X).Array(Z) = value (662)
            }
            else Row(Y).Column(X) = value (664)
```

```
        }
    }
    else do Action(Create_Row) (666)
    do database write operation (668)
}
```

As shown in the above pseudocode, if the action is a write row operation (650), then a determination is made as to whether the row exists. If the row exists (652), the index value of the row is set (654). If the row metadata for this domain equals zero indicating that the row does not exist in this domain, then the row metadata for this domain is set to one (656). Then, for each column (658), if the column is a domain column (660), then this specified value is written into the column of that domain (662). Otherwise, if the column is not a domain column, then the one value in that column is replaced by the indicated value (664).

If the row does not exist in the data structure, then the create row operation is called (666). Further, after creating the row or updating the columns, a database write operation is performed (668).

In addition to the above operations, delete operations may also be performed. In particular, the domain may be deleted by collapsing the domains by one or by leaving the domain blank, whichever is preferred. Further, a row may be deleted. If a row exists in another domain, then it is deleted in the particular domain by just marking it as not existing in that domain. If it is not in any other domain, then the values may be deleted from the row.

Although various operations are described above and exemplary implementation details are provided for those operations, additional, fewer or different operations may be provided without departing from the spirit of the present invention. Further, implementation details for each of the operations may be different from those described above.

The three-dimensional data structure of the present invention is usable in any situation in which a data structure can be used to represent information. It is particularly useful in those situations in which multiple domains are represented by the structure and some of the information in the domains is variant for the domains, but some of the information is invariant among the domains.

One specific example of an environment to use a three-dimensional data structure is a distributed or clustered environment that has one or more nodes defined simultaneously in multiple clusters of nodes. A cluster includes nodes that share resources and collaborate with each other in performing tasks.

Figure 7:
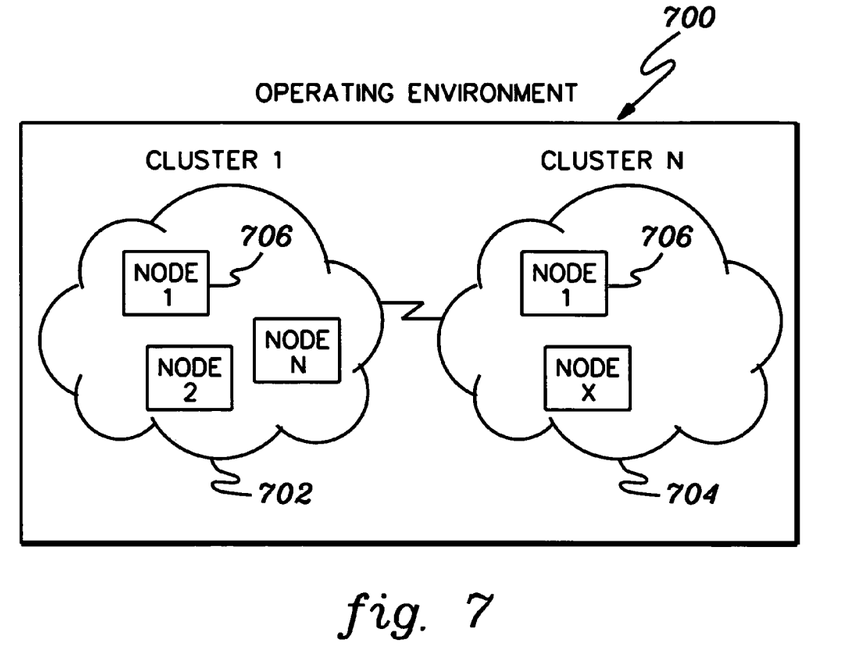
FIG. 7 depicts another example of an operating environment to incorporate and use one or more aspects of the present invention.

An example of a clustered environment is depicted in FIG. 7. As shown, an operating environment 700 includes one cluster 702 and another cluster 704. Each cluster has a plurality of nodes, but Node 1 (706) is simultaneously defined in multiple clusters. Since it is the same node being defined in multiple clusters, some of the information regarding the node is the same regardless of the cluster; however, some of the information is different. Thus, a three-dimensional data structure, defined in accordance with one or more aspects of the present invention, is used to represent this environment. In this example, the data structure is defined as having n domains, each domain representing a cluster 1-n. Included within the data structure are one or more rows for each domain, and each row includes a plurality of columns. Those columns with common information for Node 1 of the multiple clusters are zero depth columns, and those columns with varying information for Node 1 are non-zero depth columns. By not replicating the common data, the overall storage required for the data structure is reduced.

Again, although, in one example, the three-dimensional data structure is used to represent nodes defined simultaneously to multiple clusters, this is only one example. The data structure may be used in many other instances.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
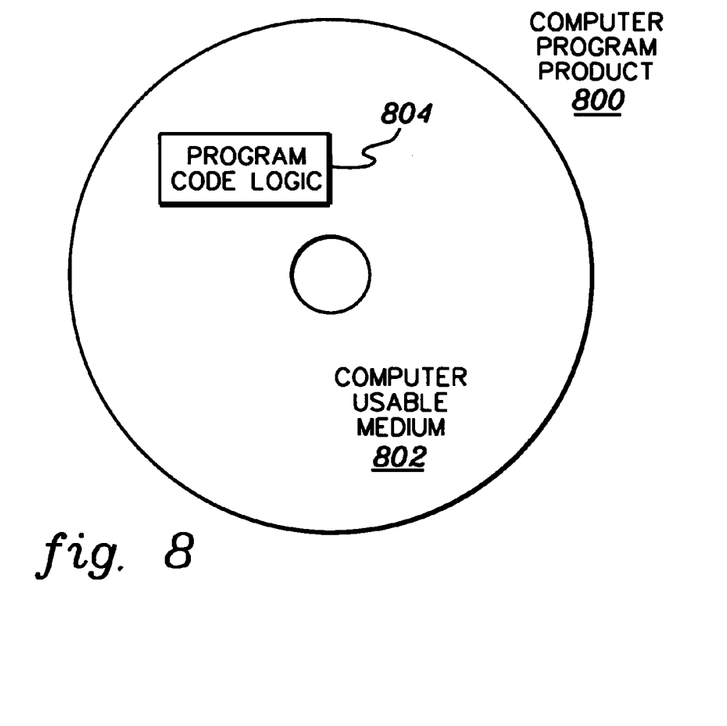
FIG. 8 depicts one example of a computer program product used in accordance with an aspect of the present invention.

One example of an article of manufacture or a computer program product incorporating one or more aspects of the present invention is described with reference to FIG. 8. A computer program product 800 includes, for instance, one or more computer usable media 802, such as, a floppy disk, a high capacity read-only memory in the form of an optically read compact disk or CD-Rom, a tape, a transmission type media, such as a digital or analog communications link, or other recording media. Recording medium 802 stores computer readable program code means or logic 804 thereon to provide and facilitate one or more aspects of the present invention.

A sequence of program instructions or a logical assembly of one or more interrelated modules defined by one or more computer readable program code means or logic direct components of the environment to perform one or more aspects of the present invention.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

Described in detail above is a capability for providing and maintaining a three-dimensional data structure. In one example, the three-dimensional data structure includes at least one column of data having a depth of zero indicating that the data value of the at least one column is invariable for the plurality of domains represented by the structure, and at least another column of data having a depth greater than zero indicating that multiple data values are provided for the plurality of domains. The data structure is maintained via various operations that can be performed on the structure.

In another example, the data structure includes one or more non-zero depth columns and no zero depth columns.

In accordance with an aspect of the present invention, a projection technique is used to provide desired data. Columns which have unique data per domain are defined as three-dimensional, where the depth correlates the various domains which are known by, for instance, a registry/database. Data which is not variable by domain includes a column with zero depth, and thus, includes only a single set of data. Reference and update to the table is done by specifying which domain is of interest. This is automated to the client, if the appropriate domain is known to the registry/database code outside of the application making the request. The registry/database then projects the appropriate third-dimension (depth) for the columns onto the front plane including the data that is invariant by domain. Thus, a projection of the appropriate data is made into the table definition as seen by the client application, and the client need not have knowledge of the number of domains or of any differences in table definition.

Although examples are described herein, many variations to these examples may be provided without departing from the spirit of the present invention. For example, environments other then those described above may incorporate and/or use one or more aspects of the present invention. Further, domains, other than clusters, may be represented by a three-dimensional data structure defined and maintained in accordance with one or more aspects of the present invention. As yet further examples, a different number of rows, columns and/or depth may be included in the three-dimensional data structure.

In one example, the depth of the structure is equivalent to the number of domains represented by the structure. In other embodiments, however, the depth does not correspond to the number of domains represented by the structure. For instance, the depth is less than the number of the domains represented by the structure (e.g., one depth represents a number of domains). Other variations are also possible. Further, the depth of each non-zero depth column can vary from one column to another. For example, one non-zero depth column has a depth of two, while another non-zero depth column has a depth of three. Many other variations are possible.

Advantageously, the capabilities of one or more aspects of the present invention reduce the storage requirement of a data structure by not storing redundant data. Further, advantageously, the number of tables are reduced, and operations, such as SQL join operations, are not necessary in order to reference the table data. As one example, one or more capabilities of the present invention are directed at condensing multiple separate SQL tables into a single table when some or most of the data is the same in the separate tables. The multiple dimensions refer to the stacking of these different tables into a three-dimensional table, which can be referenced by specifying the depth (table desired), while the database itself only stores the non-replicated column data.

Advantageously, one or more aspects of the present invention allows a node to be a member of multiple independent clusters simultaneously. It allows multiple different data definitions to share a database (registry) table.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of storing data in an operating environment having a plurality of domains, said method comprising:

obtaining a computer storage medium comprising a relational database for storing data of a plurality of domains;

storing data for multiple relational domains of the plurality of domains in the relational database as a three-dimensional data structure, said three-dimensional data structure comprising:

multiple columns and multiple rows defining a two-dimensional array of data cells, and at least one column of data cells of the array of data cells comprising a cell depth greater than zero, thereby defining the three-dimensional structure, and wherein the cell depth greater than zero indicates that multiple depth-wise data values are provided for the at least one data cell of the array of data cells, each depth-wise data value being associated with a different domain of the multiple relational domains, and wherein for each data cell of the at least one data cell, one depth-wise data value of the data cell associated with one domain is different from at least one other depth-wise data value of the data cell associated with another domain of the multiple relational domains; and wherein the three-dimensional data structure further comprises at least one cell of the array of data cells having a depth of zero, meaning that the at least one data cell of zero depth is invariable for the multiple relational domains of the operating environment, and wherein the at least one data cell of zero depth contains an actual valid data value which is common to the multiple relational domains.

2. The method of claim 1, further comprising retrieving data from the three-dimensional data structure, the retrieving comprising:

identifying a domain for which data is to be read;

selecting a column of the three-dimensional data structure from which data is to be read;

determining, for the selected column, whether the selected column has a cell depth greater than zero;

indexing into the three-dimensional data structure to a cell depth associated with the identified domain to read the data value for that domain, in response to the determining indicating the selected column has a cell depth greater than zero.

3. The method of claim 1, wherein storing data for multiple domains further comprises creating an additional domain in the three-dimensional data structure by increasing cell depth of the at least one data cell of the array of data cells.

4. The method of claim 3, wherein creating the additional domain comprises:

selecting a column of the three-dimensional data structure;

determining, for the selected column, whether the selected column has a data cell with a cell depth greater than zero;

increasing cell depth for the three-dimensional data structure within the selected column, in response to the determining indicating that the selected column has a depth greater than zero.

5. The method of claim 3, further comprises creating a row for the additional domain.

6. The method of claim 5, wherein creating the row comprises:

allocating space in the three-dimensional data structure for an additional row in the multiple columns; and populating the additional row in the multiple columns with data.

7. The method of claim 6, wherein creating the row further comprises:

initially determining whether the additional row already exists in the three-dimensional data structure;

performing the allocating and populating, in response to the determining indicating that the row does not already exist in the three-dimensional data structure.

8. The method of claim 5, further comprising writing data to the additional row in the three-dimensional data structure for the additional domain.

9. The method of claim 1, wherein each domain comprises a cluster of one or more nodes, and said data comprises configuration information for at least one node of the one or more nodes of the cluster.

* * * * *